United States Patent [19]

Wood

[11] Patent Number: 4,682,714

[45] Date of Patent: Jul. 28, 1987

[54] NOZZLE CONSTRUCTION AND METHOD OF MAKING THE SAME

[75] Inventor: Chester W. Wood, Milford, Ohio

[73] Assignee: Dover Corporation, New York, N.Y.

[21] Appl. No.: 796,817

[22] Filed: Nov. 12, 1985

[51] Int. Cl.[4] .......................... B67B 5/00; B21D 39/20; F16L 13/14

[52] U.S. Cl. .................................... 222/153; 222/574; 285/92; 285/382.4; 29/512; 29/523

[58] Field of Search ........................ 222/153, 566, 574; 285/92, 382.4; 29/157 R, 509, 512, 523

[56] References Cited

U.S. PATENT DOCUMENTS

| | | | |
|---|---|---|---|
| 3,061,269 | 10/1962 | Sinkler | 29/523 |
| 3,428,338 | 2/1969 | Corwin | 285/382.4 X |
| 3,938,240 | 2/1976 | Holden | 285/382.4 X |
| 4,450,879 | 5/1984 | Wood | 141/209 |
| 4,530,527 | 7/1985 | Holmberg | 29/523 X |

*Primary Examiner*—Leslie J. Paperner
*Assistant Examiner*—Jay I. Alexander
*Attorney, Agent, or Firm*—Kinney & Schenk

[57] ABSTRACT

A nozzle construction has an end of a spout member threaded into an opening of an adaptor member until the members are disposed in a predetermined threaded condition thereof. One of the members then has a portion thereof deformed into a locking position with the other of the members to tend to prevent relative threading movement between the members from the predetermined threaded condition.

15 Claims, 12 Drawing Figures

NOZZLE CONSTRUCTION AND METHOD OF MAKING THE SAME

BACKGROUND OF THE INVENTION

1. Field of the Invention

This invention relates to a new nozzle construction for dispensing fuel, such as gasoline at a service station for filling the gasoline tanks of transportation vehicles, and to a new method of making such a new nozzle construction.

2. Prior Art Statement

It is known to provide a nozzle construction for dispensing fuel and the like and comprising a spout member having opposed ends one of which is threaded, and an adaptor member having a threaded part threaded to the one end of the spout member whereby the spout member and the adaptor member are disposed in a predetermined threaded condition thereof, an adhesive means having been disposed between the threaded parts of the members for the purpose of tending to prevent relative threading movement between the members from the predetermined threaded condition thereof. For example see the U.S. Pat. No. 4,450,879, to Chester W. Wood.

SUMMARY OF THE INVENTION

One feature of this invention is to provide a new nozzle construction wherein unique means are provided for tending to prevent relative threading movement between a spout member and an adaptor member of a nozzle construction from a desired predetermined threaded condition thereof.

In particular, it has been found according to the teachings of this invention that a prior known nozzle construction that has a threaded end of a spout member threaded into an internally threaded opening of an adaptor member and is being held by adhesive means on the threaded parts thereof in a predetermined threaded condition thereof, such as wherein a sensing opening of the spout member is rotationally oriented with cooperating structure on the adaptor member, has a tendency for the adhesive means to be adversely affected by the fuel being dispensed thereby, such as by methanol being utilized in the fuel, whereby the adhesive means deteriorates and thereby permits relative threading movement between the spout member and the adaptor member from the desired predetermined threaded condition thereof.

However, it was found according to the teachings of this invention that one of the members of such a nozzle construction can have a portion thereof deformed into a mechanical locking position with the other of the members to tend to prevent such relative threading movement between the members from the predetermined threaded condition thereof whereby the aforementioned problem is substantially eliminated.

In particular, one embodiment of this invention provides a nozzle construction for dispensing fuel and the like and comprising a spout member having opposed ends one of which is threaded, and an adaptor member having a threaded part threaded to the one end of the spout member whereby the spout member and the adaptor member are disposed in a predetermined threaded condition thereof, one of the members having a portion thereof deformed into a locking position with the other of the members to tend to prevent relative threading movement between the members from the predetermined threaded position thereof.

Accordingly, it is an object of this invention to provide a new nozzle construction having one or more of the novel features of this invention as set forth above or hereinafter shown or described.

Another object of this invention is to provide a new method of making such a nozzle construction, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENT

Figure 1:
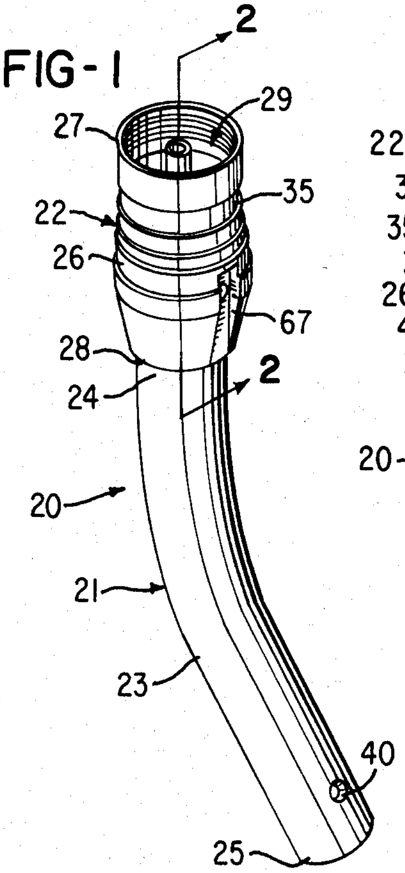
FIG. 1 is a perspective view of the new nozzle construction of this invention.
Figure 2:
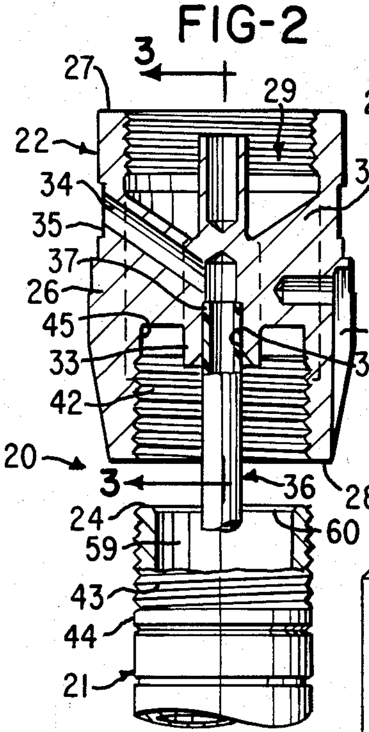
FIG. 2 is an enlarged, fragmentary, exploded sectional view of the adaptor member and spout member of the nozzle construction of FIG. 1 and illustrates one of the steps of the method of this invention for making the nozzle construction of FIG. 1, FIG. 2 illustrating the adaptor member in a cross section thereof that is taken substantially on line 2—2 of FIG. 1.

While the various features of this invention are hereinafter illustrated and described as being particularly adapted to provide a nozzle construction for dispensing fuel into the filler pipes of the gasoline storage tanks on automobiles and the like at conventional filling stations and the like wherein the nozzle construction is hand operated in a manner well known in the art, it is to be understood that the various features of this invention can be utilized singly or in various combinations thereof to provide nozzle constructions for dispensing other fluids as desired.

Therefore, this invention is not to be limited to only the embodiment illustrated in the drawings, because the drawings are merely utilized to illustrate one of the wide variety of uses of this invention.

Referring now to FIG. 1, the new nozzle construction of this invention is generally indicated by the reference numeral 20 and comprises a spout member 21 threadedly interconnected to an adaptor member 22 in a manner hereinafter set forth whereby the nozzle construction 20 is adapted to form part of a hand operated nozzle device (not shown) that is utilized for dispensing gasoline from a fuel pump at a conventional service station into the filler pipe of the gasoline storage tank of a transportation vehicle in a manner well known in the art. For example, see the aforementioned U.S. Pat. No. 4,450,879 to Chester W. Wood whereby this patent is being incorporated into this disclosure by this reference thereto so that a further discussion of the use and operation of the nozzle construction 20 in a completed assembly is not necessary as the same is well known in the art.

The spout member 21 comprises a tubular member 23 that has opposed open ends 24 and 25 and is bent at an angle between the ends 24 and 25 in a manner well known in the art, the spout member 21 being formed of any suitable material, such as metallic material as illustrated.

Figure 7:
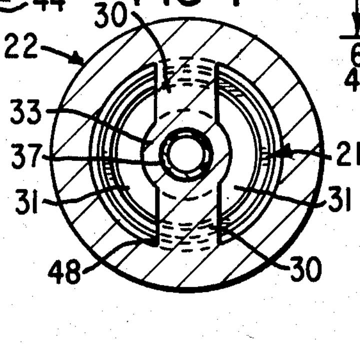
FIG. 7 is a cross-sectional view of the nozzle construction of FIG. 5 and is taken on line 7—7 of FIG. 5.

The adaptor member 22 comprises a substantially straight tubular member 26 having opposed ends 27 and 28 that are respectively interrupted by an opening means 29 that passes through the adaptor member 22 while defining an integral interior web portion 30 that extends between opposed sides thereof in the manner illustrated in FIG. 7 and thereby providing two crescent-shaped portions 31 of the opening 29 on opposite sides of the web portion 30, the adaptor member being formed of any suitable material, such as metallic material as illustrated.

The web portion 30 of the adaptor member 22 has an opening 32 interrupting a lower tubular part 33 thereof and intersecting with an angular opening 34 that interrupts the external peripheral surface 35 of the adaptor member 22.

A flexible tubular member 36 has one end 37 thereof disposed and secured in the opening 32 and the other end 38 thereof carrying a tip member 39 that has an opening (not shown) aligned with an opening 40 that passes transversely through the end 25 of the spout member 21.

In this manner, the level of the fuel in the gas tank being filled by the nozzle construction 20 can be sensed in a conventional manner by utilizing the passage means of the tubular member 36 and the opening 34 in the adaptor member 22 to automatically shut off the nozzle device in a manner well known in the art when a certain liquid level has been provided.

However, since the adaptor member 22 must be assembled in the remaining structure of the nozzle device utilizing the same so that the opening 34 thereof is properly oriented with connecting structure of the nozzle device and since the opening 40 in the spout member 21 must be properly rotationally oriented with the passage 34 in the adaptor member 22, the rotational position of the spout member 21 relative to the adaptor member 22 in the assembled condition of FIG. 1 must be maintained as will be apparent hereinafter.

The opening means 29 through the adaptor member 22 defines an internal peripheral surface means 41 of the adaptor member 22 that has a portion in the end 28 thereof internally threaded by threads 42 for threadedly receiving threads 43 that are externally formed in the outer peripheral surface 44 of the end 24 of the spout member 21.

The opening means 29 in the adaptor member 22 in combination with the integral internal web means 30 thereof define a pair of substantially rectangular abutments 45 that extend below the web 30 and integrally join with a substantially annular shoulder 46 that is provided at the inner end of the threads 42 of the adaptor member 22, the annular shoulder 46 being substantially flat and being transverse to the longitudinal axis 22' of the adaptor member 22 while extending radially outwardly from the internal diameter of the threads 42. The abutments 45 have an inner surface 47 disposed substantially coaxial with the inner parts of the threads 42, each abutment 45 defining a pair of spaced apart shoulders 48 that are disposed substantially parallel to each other and parallel to the longitudinal axis 22' of the adaptor member 22 for a purpose hereinafter set forth.

Figure 3:
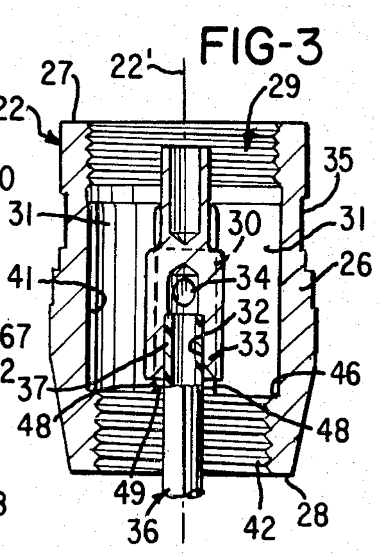
FIG. 3 is a cross-sectional view of the adaptor member of FIG. 2 and is taken on line 3—3 of FIG. 2.
Figure 8:
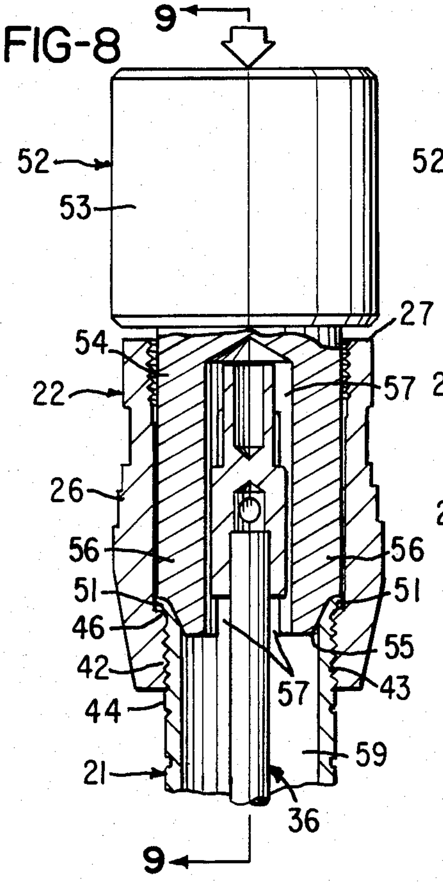
FIG. 8 is a view similar to FIG. 5 and illustrates the swaging tool in its fully inserted and swaging condition.
Figure 10:
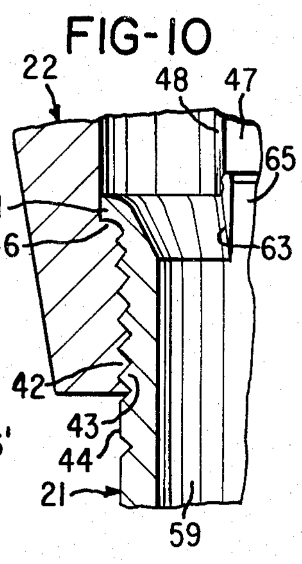
FIG. 10 is an enlarged view of part of the nozzle construction of FIG. 8 and illustrates part of the swaged portion of the spout member in its locking position with the adaptor member.
Figure 11:
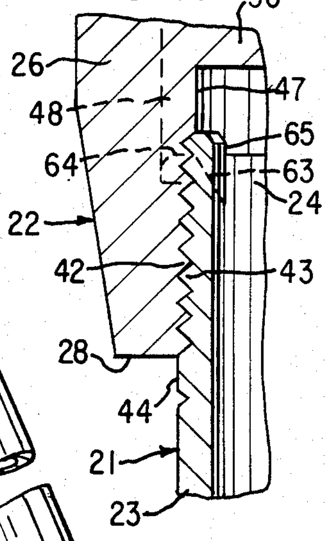
FIG. 11 is an enlarged view of part of the nozzle construction of FIG. 9 and illustrates part of the non-swaged portion of the spout member.
Figure 12:
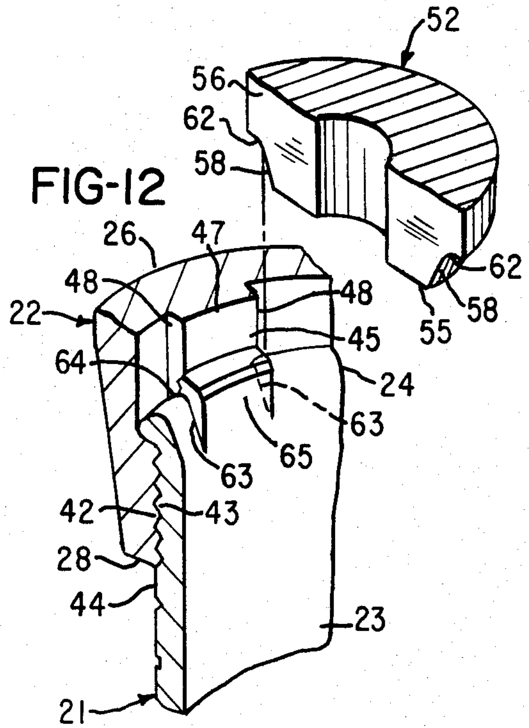
FIG. 12 is a fragmentary perspective view illustrating the swaged and unswaged portions of the spout member of the nozzle construction of this invention with FIG. 12 additionally illustrating part of the swaging tool in an exploded perspective manner relative to the nozzle construction of this invention.

If desired, the lower parts of the abutments 45 can be provided with threads 49 that compliment the threads 42 as illustrated in FIG. 3 so as to permit the spout member 21 to have its threaded part 43 threaded into the opening 29 in such a manner that the end surface 50 of the end 24 of the spout member 21 can extend inwardly beyond the annular shoulder 46 of the adaptor member 22 an amount sufficient to permit the extending portion 51 to be deformed radially outwardly and against the surface 46 in the manner illustrated in FIGS. 8, 10 and 12 so as to be disposed in a locking position that tends to prevent threading movement between the spout member 21 and the adaptor member 22 in either an unthreading relation or a further threading-in relation thereof as will be apparent hereinafter, the deforming operation on the portion 51 of the spout member 21 being accomplished by the use of a swaging tool of this invention that is generally indicated by the reference numeral 52 and now to be described.

Figure 5:
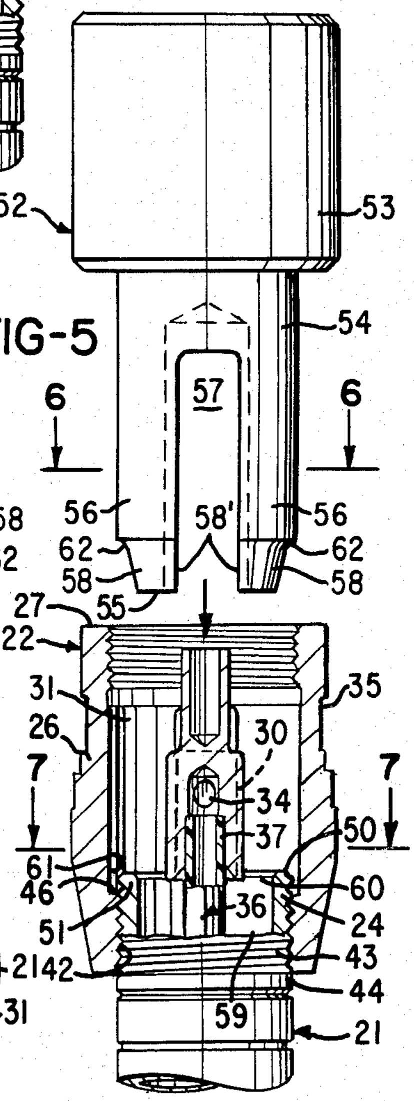
FIG. 5 is a cross-sectional view taken on line 5—5 of FIG. 4 and additionally illustrates a swaging tool in elevation that is to be subsequently inserted into the assembly of FIG. 5 to perform another step in the method of this invention.
Figure 4:
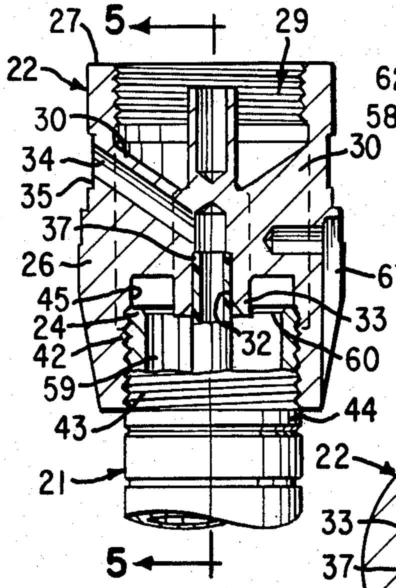
FIG. 4 is a view similar to FIG. 2 and illustrates the spout member threaded into the adaptor member and thereby illustrating another step in the method of this invention.
Figure 6:
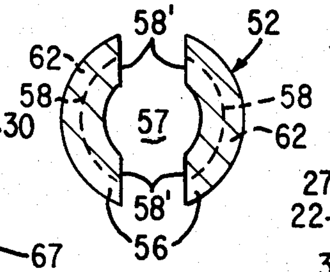
FIG. 6 is a cross-sectional view of the swaging tool and is taken on line 6—6 of FIG. 5.

The swaging tool 52 is formed of any suitable material, such as metallic material, and has an upper enlarged cylindrical portion 53 in FIG. 5 and a lower reduced cylindrical portion 54 that has its lower end 55 bifurcated to define two legs 56 spaced from each other by a slot or cavity 57 that is adapted to permit the legs 56 to straddle the web portion 30 of the adaptor member 22 when the tool 52 is inserted into the opening 29 through the end 27 thereof. In this manner, lower cam or swaging portions 58 of the legs 56 are adapted to be received within the tubular opening 59 that passes through the spout member 21 and progressively cam against the internal peripheral surface 60 of the upper peripheral portion 51 of the end 24 of the spout member 21 to cam and deform such portion 51 radially outwardly toward the internal peripheral part 61 of the adaptor member 22 that is defined by the peripheral surface means 41 thereof, the sloping cam surfaces 58 of the legs 56 respectively terminating into downwardly facing parts 62 thereof that compact the outwardly moved portion 51 fully against the annular shoulder 46 of the adaptor member 22 in the manner illustrated in FIGS. 8, 10 and 12.

Such swaging of the portion 51 of the spout member 21 by the cam surface 58 of the swaging tool 52 causes the portion 51 to be slit or sheared on opposite sides of each abutment 45 as defined by the slits 63 in FIG. 12 so that the deformed portions 51 define shoulders 64 which are respectively disposed against the shoulders 48 of the abutments 45 on each side of resulting unsheared parts 65 of the portion 51 of the spout member 21 so that the cooperating shoulders 48 and 64 of the adaptor member 22 and the spout member 21 tend to prevent rotational threading movement, either inwardly or outwardly, between the spout member 21 and the adaptor member 22 after the swaging tool 52 has deformed the portion 51 of the spout member 21 into its final mechanical locking position as illustrated in FIGS. 8, 10 and 12.

The swaging tool 52 has shearing edges 58′ that cooperate with the surfaces 48 of the abutments 45 to shear the portion 51 of the spout member 21 and from the slits 63 while the cam surface 58 of the swaging tool 52 is deforming the portion 51 in the manner previously described.

Therefore, it can be seen that the nozzle construction 20 of this invention can be made by the method of this invention by merely threading the end 24 of the spout member 21 into the adaptor member 22 so that the portion 51 of the spout member 21 extends longitudinally beyond the annular shoulder 46 of the adaptor member 22 and the opening 40 in the spout member 21 has been properly rotationally oriented relative to the opening 34 in the adaptor member 22 so that the spout member 21 and adaptor member 22 are disposed in the desired predetermined threaded condition thereof. Thereafter, the tool 52 can then be inserted into the end 27 of the adaptor member 22 and have sufficient force applied thereto so that the cam surface 58 thereof will engage against the internal peripheral surface 60 of the projecting portion 51 of the spout member 21 and cam the same radially outwardly and downwardly against the surface 46 while shearing the same at the abutments of the adaptor member 22 in the manner previously described so as to deform the portion 51 into a mechanical locking position thereof wherein the portion 51 is locked against the surface 46 so as to tend to prevent unthreading movement of the spout member 21 from the adaptor member 22 and is locked into engagement with the shoulders 48 of the abutments 45 as illustrated in FIG. 12 so as to tend to prevent not only unthreading movement of the spout member 21 relative to the adaptor member 22, but to also tend to prevent inward threading movement between the same whereby the opening 40 in the spout member 21 will remain in its properly oriented position relative to the opening 34 in the adaptor member 22 once the previously described swaging operation on the portion 51 has taken place.

Figure 9:
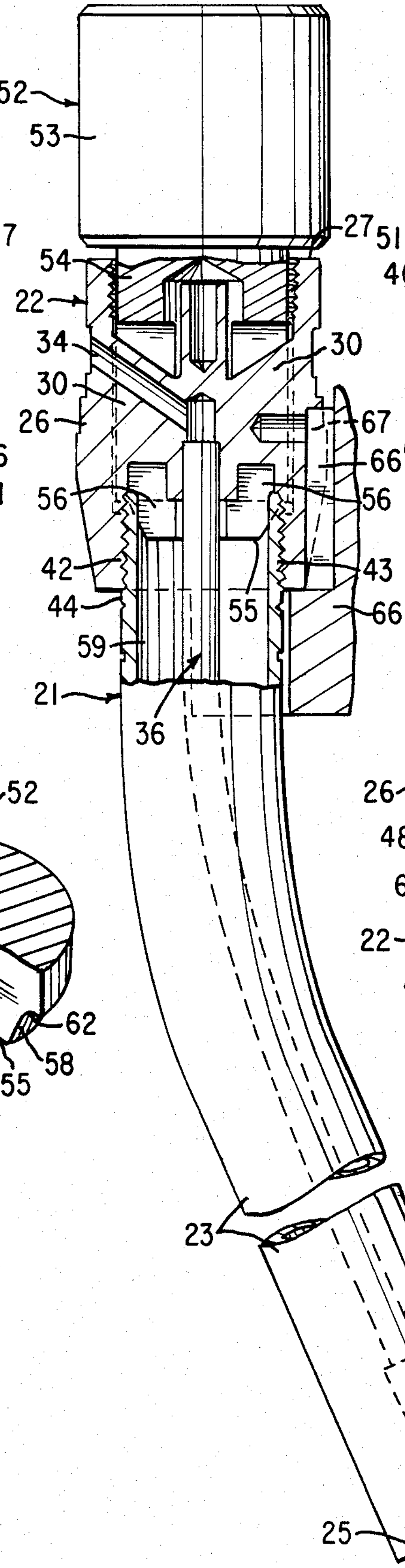
FIG. 9 is a fragmentary cross-sectional view, that is partially in elevation, and is taken substantially on the line 9—9 of FIG. 8.

If desired, a suitable holding fixture 66, FIG. 9, can be utiilized to hold the adaptor member 22 during the aforementioned swaging operation with the fixture 66 having a suitable keyway means 66′ for being received in a keyway slot 67 formed in the adaptor member 22 so as to position the adaptor member 22 in a proper position in the fixture 66. If desired, the fixture 66 can have suitable means, not shown, that will properly align the end 25 of the spout member 21 so that the opening 40 thereof is properly aligned with the opening 34. In addition, the fixture 66 thus is properly oriented relative to the swaging tool 52 that is adapted to be inserted into the thus held adaptor member 22 by a suitable pneumatic or hydraulic cylinder means that applies sufficient force on the tool 52 to form the swaging operation previously set forth and then retracts the tool 52 out of the adaptor member 22 after the swaging operation has taken place.

If desired, suitable adhesive means can be applied to one or both of the threaded parts 43 and 42 of the members 22 and 21 before the spout member 21 is initially threaded into the adaptor member 22 whereby such adhesive means will subsequently set after the threading and swaging operation has taken place to not only further secure the members 21 and 22 in the predetermined threaded condition thereof, but also to effectively seal the same together in a manner well known in the art.

Therefore, it can be seen that this invention not only provides a new nozzle construction, but also this invention provides a new method of making such a nozzle construction.

While the forms and methods of this invention now preferred have been illustrated and described as required by the Patent Statute, it is to be understood that other forms and method steps can be utilized and still fall within the scope of the appended claims wherein eachclaim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a nozzle construction for dispensing fuel and the like and comprising a spout member having opposed ends one of which is threaded, and an adaptor member having a threaded part threaded to said one end of said spout member whereby said spout member and said adaptor member are disposed in a predetermined threaded condition thereof, said adaptor member having an opening means therein that defines an internal peripheral surface means thereof, part of said internal peripheral surface means comprising said threaded part of said adaptor member, said one end of said spout member being externally threaded and having been threaded into said opening means of said adaptor member to said predetermined threaded condition thereof, the improvement wherein one of said members has a portion thereof deformed into a locking position with the other of said members to tend to prevent relative threading movement between said members from said predetermined threaded condition thereof, said one member that has said portion thereof deformed into said locking position thereof comprising said spout member, said portion of said spout member that has been deformed into said locking position thereof comprising part of said one end thereof, said adaptor member having locking abutment means, said portion of said one end of said spout member having been deformed into said locking position so as to be adjacent said abutment means, said abutment means of said adaptor member having opposed shoulders respectively disposed substantially parallel with the longitudinal axis of said opening of said adaptor member, said portion of said one end of said spout member having been deformed so as to be in rotational alignment with said opposed shoulders, said one end of said spout member having a free peripheral edge means, said portion of said one end of said spout member comprising part of said free peripheral edge means thereof, said free peripheral edge means having slit means on opposite sides of said abutment means, said portion of said free peripheral edge means comprising parts thereof defined in part by said slit means whereby a non-deformed portion of said free peripheral edge means is adjacent said abutment means and is disposed between said slit means.

2. A nozzle construction as set forth in claim 1 wherein said free peripheral edge means of said spout member extends beyond said threaded part of said adaptor member in a direction into said adaptor member.

3. In a method of making a nozzle construction for dispensing fuel and the like and comprising the steps of providing a spout member that has opposed ends one of which is threaded, providing an adaptor member that has a threaded part, threading said adaptor member and said one end of said spout member together whereby said spout member and said adaptor member are disposed in a predetermined threaded condition thereof, forming said adaptor member to have an opening means therein that has opposed ends and that defines an internal peripheral surface thereof, forming part of said internal peripheral surface to comprise said threaded part of said adaptor member, and forming said one end of said spout member to be externally threaded whereby said step of threading causes said one end of said spout member to be threaded into one of said ends of said opening means of said adaptor member to said predetermined threaded condition, the improvement comprising the step of deforming a portion of one of said members into a locking position with the other of said members to tend to prevent relative threading movement between said members from said predetermined threaded condition thereof, said step of deforming said portion of said one member into said locking position thereof comprising the step of swaging said portion after said step of threading said members together to said predetermined threaded condition thereof, said step of swaging comprising the step of inserting a swaging tool in the other of said ends of said opening means and against said portion of said one member with a force that causes said portion of said one member to be swaged into said locking position thereof.

4. A method of making a nozzle construction as set forth in claim 3 wherein said one member that has said portion thereof swaged into said locking position thereof comprises said spout member.

5. A method of making a nozzle construction as set forth in claim 4 wherein said portion of said spout member that has been deformed into said locking position thereof comprises part of said one end thereof and wherein said step of inserting said tool into said opening means causes said tool to be inserted into said one end of said spout member and to swage said portion substantially radially outwardly.

6. A method of making a nozzle construction as set forth in claim 5 and including the steps of forming said adaptor member to have locking abutment means, said step of swaging said portion of said one end of said spout member into said locking position causing said portion to be disposed adjacent said abutment means.

7. A method of making a nozzle construction as set forth in claim 6 and including the step of forming said abutment means of said adaptor member to have opposed shoulders respectively disposed substantially parallel with the longitudinal axis of said opening of said adaptor member, said step of swaging said portion of said one end of said spout member causing said portion to be swaged into rotational alignment with said opposed shoulders.

8. A method of making a nozzle construction as set forth in claim 7 wherein said one end of said spout member has a free peripheral edge means and wherein said portion of said one end of said spout member comprises part of said free peripheral edge means thereof.

9. A method of making a nozzle construction as set forth in claim 3 wherein said step of threading said members to a predetermined threaded condition thereof comprises the step of rotationally orienting said members relative to each other.

10. A method of making a nozzle construction as set forth in claim 8 wherein said step of swaging causes said free peripheral edge means to be slit on opposite sides of said abutment means and said portion of said free peripheral edge means to comprise parts thereof defined in part by said slit means whereby a non-swaged portion of said free peripheral edge means is adjacent said abutment means and is disposed between said slits.

11. A method of making a nozzle construction as set forth in claim 10 wherein said step of threading causes said free peripheral edge means of said spout member to extend beyond said threaded part of said adaptor member in a direction into said adaptor member.

12. A method of making a nozzle construction as set forth in claim 11 and including the step of disposing adhesive means on at least one of said threaded parts of said members before said step of threading said members together.

13. In a method of making a nozzle construction for dispensing fuel and the like and comprising the steps of providing a spout member that has opposed ends one of which is threaded, providing an adaptor member that has a threaded part, threading said adaptor member and said one end of said spout member together whereby said spout member and said adaptor member are disposed in a predetermined threaded condition thereof, forming said adaptor member to have an opening means therein that defines an internal peripheral surface thereof, forming part of said internal peripheral surface to comprise said threaded part of said adaptor member, and forming said one end of said spout member to be externally threaded whereby said step of threading causes said one end of said spout member to be threaded into said opening means of said adaptor member to said predetermined threaded condition, the improvement comprising the steps of deforming a portion of one of said members into a locking position with the other of said members to tend to prevent relative threading movement between said members from said predetermined threaded condition thereof, said step of deforming said portion of said one member into said locking position thereof comprising the step of swaging said portion after said step of threading said members together to said predetermined threaded condition thereof, said step of swaging comprising the step of inserting a swaging tool in said opening means and against said portion of said one member with a force that causes said portion of said one member to be swaged into said locking position thereof, said one member that has said portion thereof swaged into said locking position thereof comprising said spout member, said portion of said spout member that has been deformed into said locking position thereof comprising part of said one end thereof, said step of inserting said tool into said opening means causing said tool to be inserted into said one end of said spout member and to swage said portion substantially radially outwardly, forming said adaptor member to have locking abutment means, said step of swaging said portion of said one end of said spout member into said locking position causing said portion to be disposed adjacent said abutment means, and forming said abutment means of said adaptor member to have opposed shoulders respectively disposed substantially parallel with the longitudinal axis of said opening of said adaptor member, said step of swaging said portion of said one end of said spout member causing said portion to be swaged into rotational alignment with said opposed shoulders, said one end of said spout member having a free peripheral edge means, said portion of said one end of said spout member comprising part of said free peripheral edge means thereof, said step of swaging causing said free peripheral edge means to be slit on opposite sides of said abutment means and said portion of said free peripheral edge means to comprise parts thereof defined in part by said slit means whereby a nonswaged portion of said free peripheral edge means is adjacent said abutment means and is disposed between said slits.

14. A method of making a nozzle construction as set forth in claim 13 wherein said step of threading causes said free peripheral edge means of said spout member to extend beyond said threaded part of said adaptor member in a direction into said adaptor member.

15. A method of making a nozzle construction as set forth in claim 14 and including the step of disposing adhesive means on at least one of said threaded parts of said members before said step of threading said members together.

* * * * *